US006572674B1

(12) United States Patent
Avart et al.

(10) Patent No.: US 6,572,674 B1
(45) Date of Patent: Jun. 3, 2003

(54) PROCESS FOR THE TREATMENT OF STEEL WORK GASES

(75) Inventors: Pascal Avart, Bussy-Saint-Georges (FR); Jérôme Girard, Chatenay Malabry (FR); Geneviève Mure, Paris (FR); Emmanuel Pousset, Antony (FR)

(73) Assignee: L'Air Liquide - Société Anonyme á Directoire et Conseil de Surveillance pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 09/499,293

(22) Filed: Feb. 7, 2000

(30) Foreign Application Priority Data

Feb. 11, 1999 (FR) ........................................... 99 01599

(51) Int. Cl.[7] ................................................ C21B 3/04

(52) U.S. Cl. ............................ 75/433; 75/468; 75/958; 60/39.12

(58) Field of Search .......................... 75/468, 958, 433; 60/39.12

(56) References Cited

U.S. PATENT DOCUMENTS

| | | | | |
|---|---|---|---|---|
| 6,051,048 A | * | 4/2000 | Keenan | 75/958 |
| 6,141,796 A | * | 11/2000 | Cummings | 60/39.12 |
| 6,361,757 B1 | * | 3/2002 | Shikada et al. | 75/958 |

FOREIGN PATENT DOCUMENTS

| | | |
|---|---|---|
| JP | 55-128509 | 10/1980 |
| JP | 56-023207 | 3/1981 |
| JP | 60-144512 | 6/1985 |
| JP | 60-204814 | 10/1985 |
| JP | 61-284508 | 12/1986 |

* cited by examiner

*Primary Examiner*—Melvyn Andrews
(74) *Attorney, Agent, or Firm*—Young & Thompson

(57) ABSTRACT

Steel work gases (blast-furnace gases, coke-oven gases, converter gases, etc.) are burnt with an exhaust gas from a gas turbine, optionally with a supply of natural gas and of air, in a postcombustion section between the outlet of the gas turbine and the inlet of a recovery boiler, the steam from which is utilized especially for producing electrical energy.

14 Claims, 1 Drawing Sheet

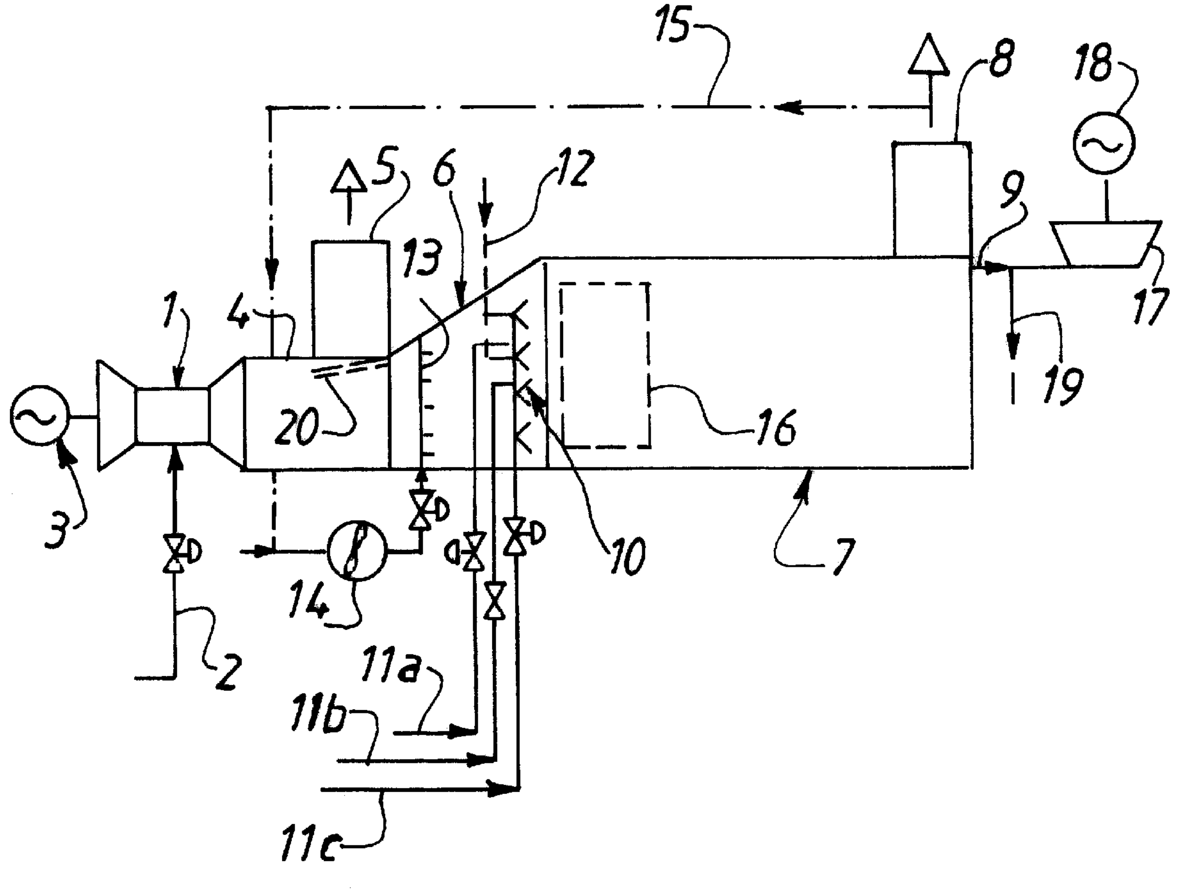
15
8
18
5
6
12
9
13
1
4
17
20
16
19
3
10
7
14
2
11a
11b
11c

PROCESS FOR THE TREATMENT OF STEEL WORK GASES

FIELD OF THE INVENTION

The present invention relates to the treatment of steel work gases such as blast-furnace gas produced in metal treatment plants.

BACKGROUND OF THE INVENTION

Currently, steel work gases (blast-furnace gases, coke-oven gases and converter gases) are burnt in conventional boilers, using atmospheric air as oxidizer. This arrangement does not allow significant thermal and/or electrical powers to be achieved. More recently, it has been proposed to burn steel work gases in gas turbines, thereby requiring expensive pretreatments (dust removal, compression to pressures up to 30 bar) of these gases and consequently require the compressors and combustion chambers of the turbines to be adapted.

SUMMARY OF THE INVENTION

The object of the present invention is to provide a novel process for the treatment of steel work gases, allowing them to be treated and utilized in an optimum fashion by burning them in a combustion section of a gas turbine and, downstream, in a recovery boiler, thus combining the production of electricity by the turbine with the efficient production of thermal energy in the recovery boiler.

To do this, according to one feature of the invention, the process for the treatment of steel work gases is characterized in that it comprises the steps of sending the steel work gas into at least one combustion section between the gas outlet of a gas turbine and the gas inlet of a recovery boiler and of burning the steel work gas in the said combustion section in order to produce steam in the recovery boiler.

Moreover, such a process offers great operating flexibility, being suitable for plants in which the flow rate and/or calorific value of the steel work gas vary/varies greatly.

This type of process also makes it possible to treat large volumes of steel work gas and, correspondingly, to achieve considerable installed powers, exceeding 200 MW.

According to other features of the invention:

- the process includes the step of furthermore introducing a stream of fresh air, at least locally, into the combustion section in order to ensure combustion of the steel work gas;
- the process includes the step of furthermore introducing a stream of combustible gas, at least locally, into the combustion section in order to guarantee combustion of the steel work gas, especially when its calorific value becomes very low.

BRIEF DESCRIPTION OF THE DRAWINGS

Further features and advantages of the present invention will emerge from the following description of embodiments, the description being given by way of entirely non-limiting illustration, with reference to the appended drawing in which:

- the single FIGURE schematically represents a combined plant for the implementation of a process according to the invention.

DETAILED DESCRIPTION OF THE PREFERRED EMBODIMENTS

The single FIGURE shows a gas turbine unit 1 supplied with gaseous or liquid combustible gas 2, for example natural gas, and driving a generator 3 delivering electrical energy.

The exhaust gases from the turbine of the gas turbine of unit 1 are sent into a duct provided with a flue 5. However, according to the invention, the duct 4 emerges in a combustion section 6 with a divergent profile emerging, in turn, in the inlet section of a recovery boiler 7 provided with a gas flue 8 and with a steam output circuit 9.

Placed in the combustion section 6 are rows of burners 10 fed, on the one hand, by at least one steel work gas supply circuit 11*a*, 11*b*, 11*c* coming from various steelmaking plants, typically blast furnaces and/or coke ovens. In one particular embodiment, the burners 10, or auxiliary burners of the latter, are able to be fed with gaseous fuel, typically natural gas, via a supply pipe 12.

In addition, according to one aspect of the invention, the combustion section 6 includes, upstream of the rows of burners 10, injector rails or nozzles 13 for injecting an oxidizer gas, slightly compressed by a blower 14. The oxidizer gas is typically atmospheric air and/or atmospheric air combined with a portion of the exhaust gases from the recovery boiler 7, supplied by a pipe 15.

According to one particular aspect of the invention, in order to take into account any fluctuations in flow rate and in calorific value of the steel work gases injected into the burners 10, the nests of exchanger tubes in the boiler 7, at least in the front part of the latter, can be selectively partially protected by heat screens 16, for example of the water-film type.

Conventionally, the steam available at the outlet (9) of the recovery boiler 7 is at least partly expanded in a turbine 17 driving a generator 18, another portion 19 of the steam being used for other industrial processes.

The process according to the invention applies to steelmaking plants, entailing the burning of large and variable amounts of steel work gases having a low NCV (Net Calorific Value), which is typically about 3500 kJ/$Sm^3$ but which can fall to values of between 3100 and 3200 kJ/$Sm^3$. When the NCV becomes very low, the flame of the burners 10 is supported by an auxiliary stream of natural gas 12 corresponding to between 3 and 10% of the energy power of the steel work gases 11*a, b, c*.

Should the gas turbine stop or should there be peaks in the production of steel work gases, the combustion of the latter takes place by injecting air or air and recycled gases introduced via the injector rails 13 so to maintain the nitrogen oxide and carbon monoxide emission levels at the outlet of the flue 8 at low values.

Symmetrically, the gas turbine 1 may operate autonomously, without combustion of these exhaust gases, a structure of pivoting dampers 20 preventing access of the gases to the combustion station 6 and deflecting them into the actual flue 5 of the turbine 1.

An illustrative embodiment of a plant for the implementation of such a process will now be given.

The turbine 1 is of the type capable of producing 70 $MW_e$ of electrical power, which propels into the combustion section 6 a stream of exhaust gases at a rate of 200 kg/s and a temperature of between 500 and 600° C. The exhaust gases from the turbine have a residual oxygen content of between 14 and 15% and a water content of greater than 5%. The steel work gases, typically at a temperature of less than 80° C., are injected into the burners 10 at a very low pressure, of less than $1.5\times10^5$ Pa and typically of between $1.05\times10^5$ Pa and $1.3\times10^5$ Pa. These steel work gases, with an NCV of about 3400 kJ/$Sm^3$, essentially consist, besides predominantly nitrogen, of CO (at least 20%) and $CO_2$ (up to 20%) with a hydrogen content and a water content which are each less than 2%. The turbine 1 is designed to deliver an exhaust gas mass flow rate of at least 2.5 times the maximum flow rate of steel work gases to be treated. The flow rate of oxidizer air (pure or mixed) 13 is, should the turbine stop, greater than 60%, typically approximately 70%, of the nominal flow rate of exhaust gases from the turbine.

The process according to the invention makes it possible to deliver a combustion power of between 50 and 200 $MW_{th}$, under conditions indicated in the table below, for a recovery boiler operating with a steam pressure of approximately $100\times10^5$ Pa absolute and a steam temperature of about 550° C.

| Combustion power $MW_{th}$ | Boiler inlet exhaust-gas temperature ° C. | Boiler inlet exhaust-gas flow rate kg/s | Steam flow rate kg/s |
|---|---|---|---|
| 50 | 720 | 230 | 50 |
| 200 | 1020 | 290 | 100 |
| 200 (fresh air) | 850 | 220 | 60 |

Although the present invention has been described in relation to particular embodiments, it is not limited thereby but is, on the contrary, capable of modifications and variants which will be apparent to those skilled in the art. In particular, depending on the volumes and the number of sources of steel work gases, the latter may be burnt in at least two plants of the type described above, these acting in parallel and/or alternately.

What is claimed is:

1. A process of treating steel work gas available from a steel work plant in a combined installation comprising a gas turbine having an exhaust gas outlet, a recovery boiler having a hot gas inlet and a combustion section between the exhaust gas outlet and the hot gas inlet, the process comprising the steps of:

supplying the steel work gas and an exhaust gas from the gas turbine to the combustion section discharging into the recovery boiler; and burning at least the steel work gas in the combustion section.

2. The process according to claim 1, further comprising the step of introducing a stream of air into the combustion section in order to ensure combustion of the steel work gas.

3. The process according to claim 1, further comprising the step of introducing a stream of an additional combustible gas into the combustion section in order to ensure combustion of the steel work gas.

4. The process according to claim 3, wherein the flow rate of the additional combustible gas does not exceed 10% of the flow rate of the steel work gas.

5. The process according to claim 1, wherein the steel work gas is supplied into the combustion section at a pressure of less than $1.3\times10^5$ Pa.

6. The process according to claim 1, wherein the flow rate of the steel work gas varies between 15 and 100 kg/s.

7. The process according to claim 6, wherein the flow rate of the exhaust gas from the turbine is at least 2.5 times the maximum flow rate of the steel work gas.

8. The process according to claim 2, wherein the flow rate of the air is greater than 60% of the nominal flow rate of the exhaust gas from the turbine.

9. The process according to claim 1, wherein the combustion of the steel work gas delivers a thermal power of between 40 and 200 $MW_{th}$.

10. The process according to claim 1, further comprising the step of providing a heat screen for protecting front exchange sections of the recovery boiler.

11. A process of treating residual gas from a steel work plant in a combined installation comprising a gas turbine having an exhaust gas outlet, a recovery boiler having a hot gas inlet and a combustion section between the exhaust gas outlet and the hot gas inlet, the process comprising the steps of:

supplying the residual gas, at least one fuel gas and an exhaust gas from the gas turbine to the combustion section discharging into the recovery boiler coupled to a steam turbine generator; and selectively burning the residual gas and at least part of the fuel gas and of the exhaust gas to provide heat to the recovery boiler.

12. The process of claim 11, further comprising the step of adjusting the relative flows of the residual gas and of the fuel gas burnt in the combustion section.

13. The process of claim 11, further comprising the step of selectively supplying air to the combustion section to assist burning of the gases therein.

14. The process of claim 12, wherein the net calorific value of the residual gas is lower than 3500 $kJ/Sm^3$.

* * * * *